Feb. 11, 1941.  A. T. PETERSON  2,231,194
AUTOMOBILE HUB CONSTRUCTION
Filed April 22, 1937   3 Sheets-Sheet 2
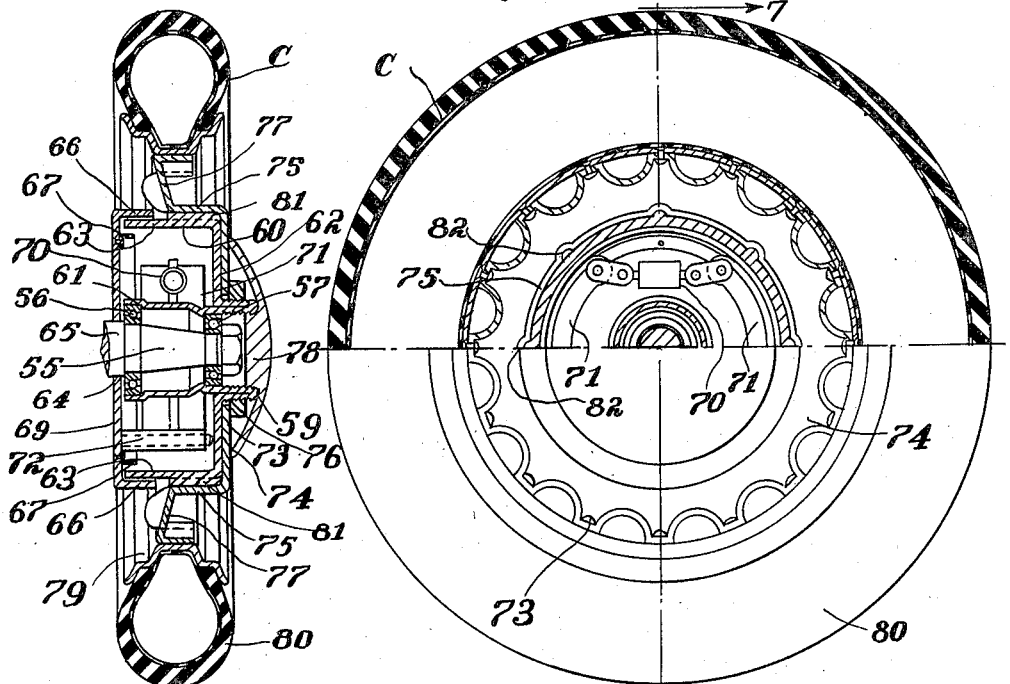
Fig. 7.   Fig. 8.
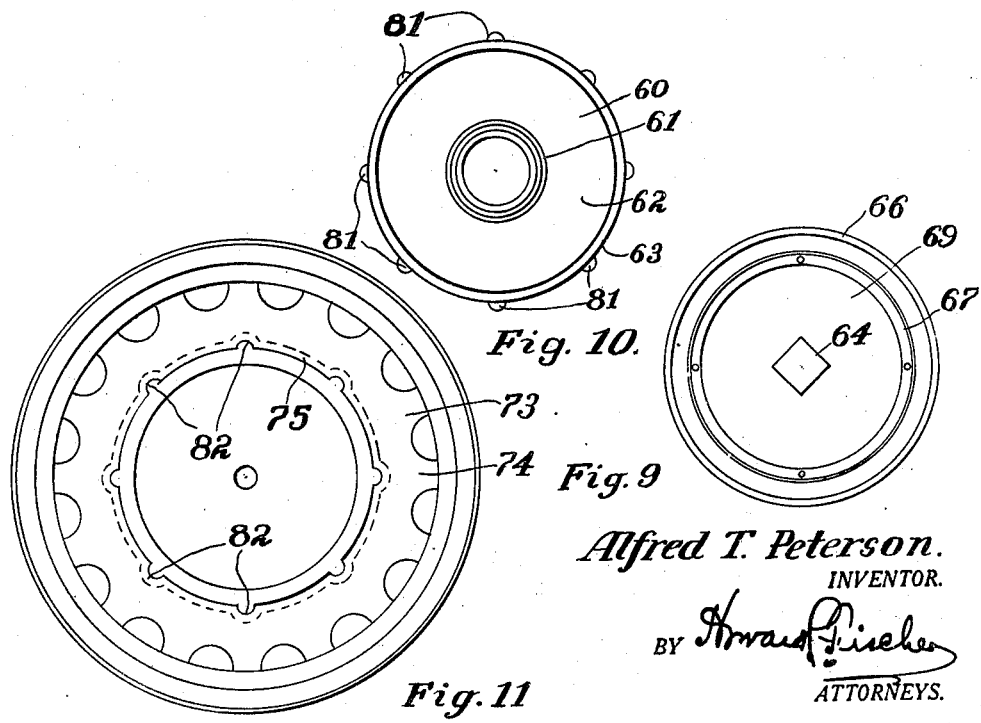
Fig. 10.
Fig. 9.
Fig. 11.
Alfred T. Peterson.
INVENTOR.
BY Howard Fischer
ATTORNEYS.

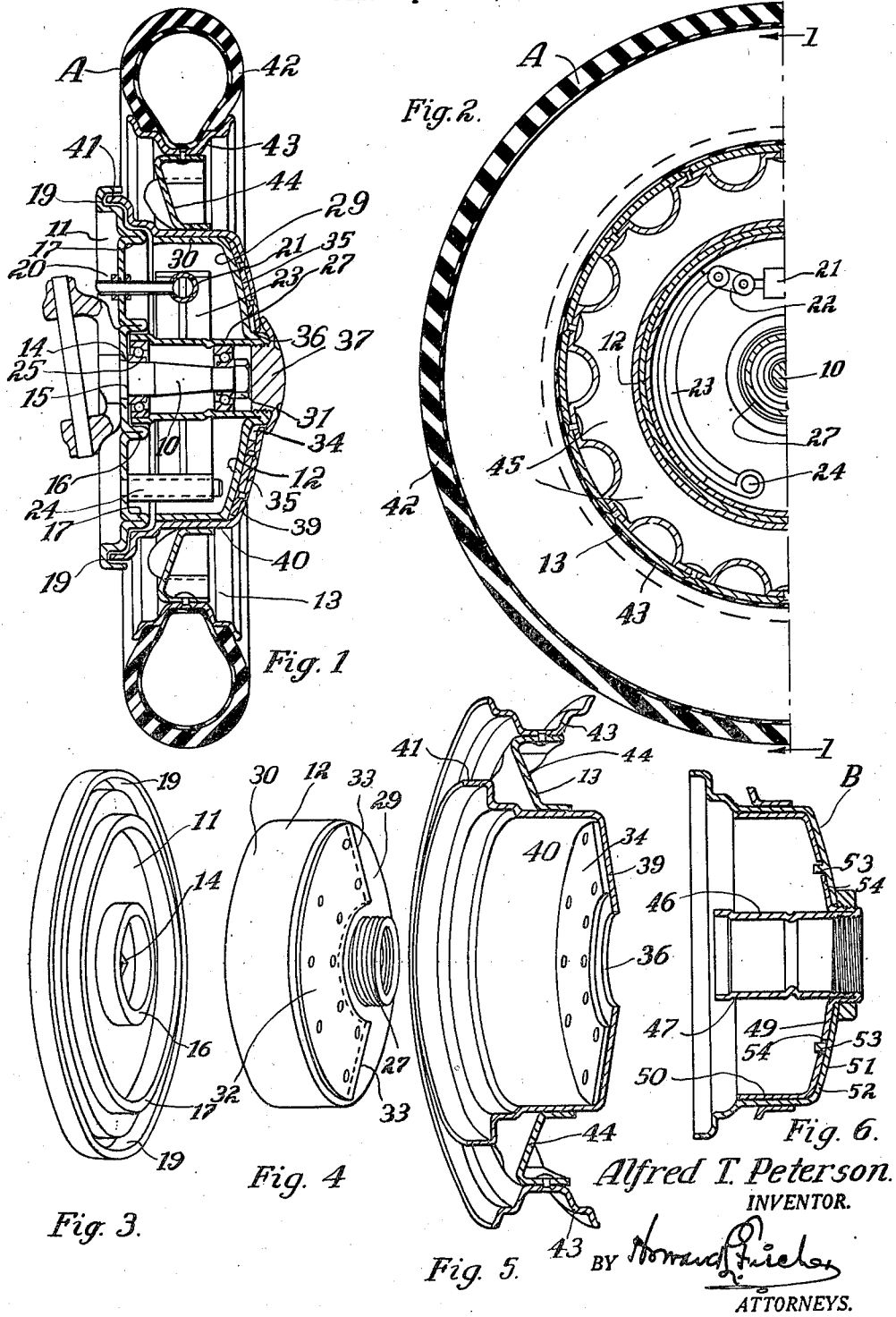

Feb. 11, 1941.  A. T. PETERSON  2,231,194
AUTOMOBILE HUB CONSTRUCTION
Filed April 22, 1937   3 Sheets-Sheet 3
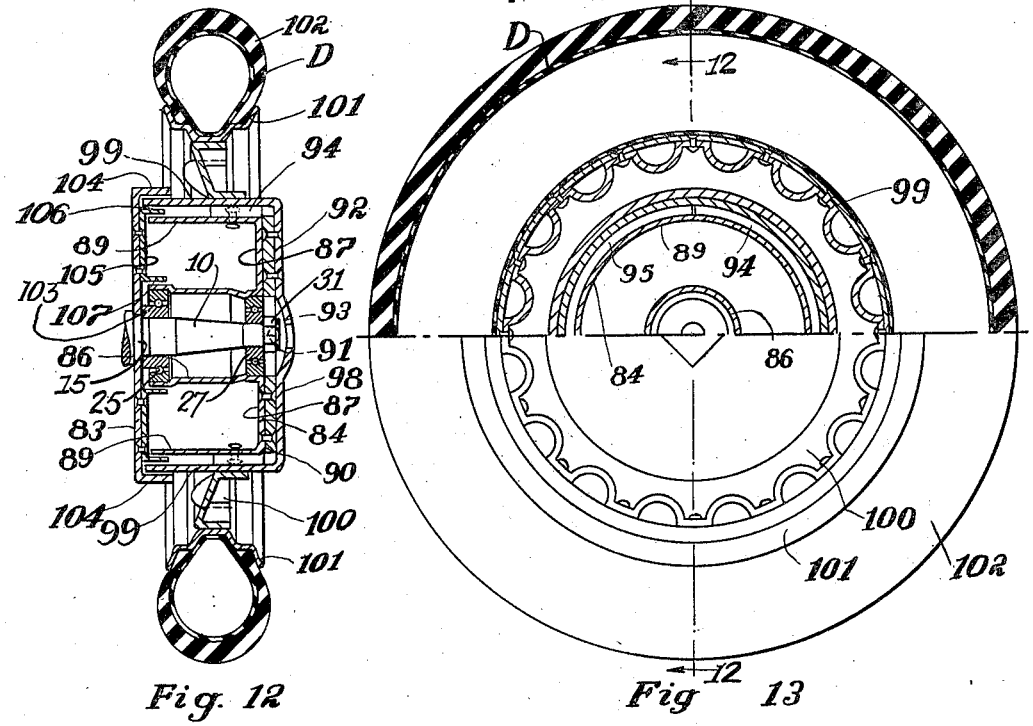
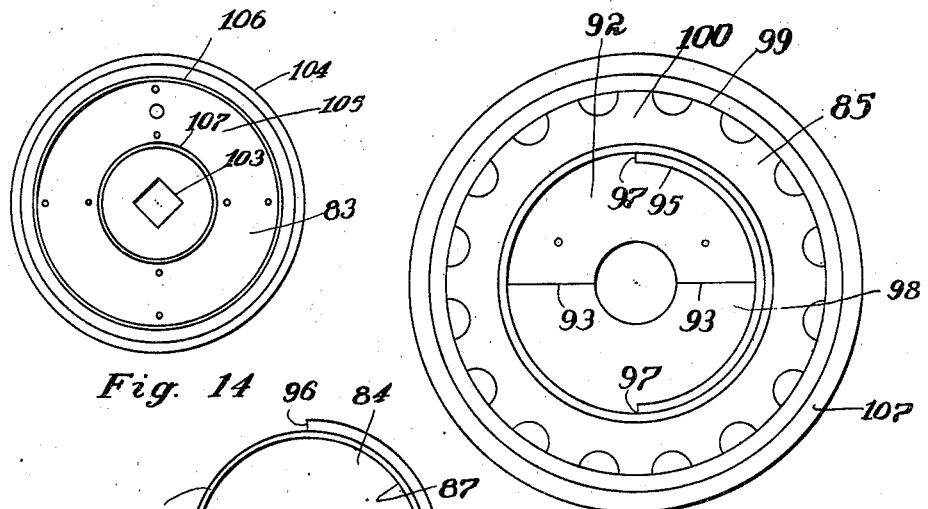
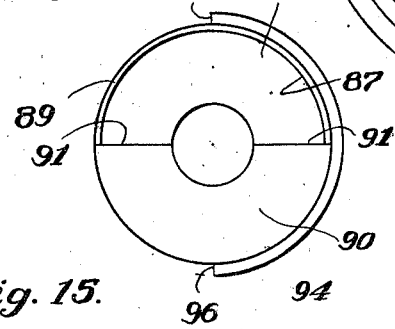
Alfred T. Peterson.
INVENTOR.

Patented Feb. 11, 1941

2,231,194

UNITED STATES PATENT OFFICE 2,231,194

AUTOMOBILE HUB CONSTRUCTION

Alfred T. Peterson, St. Paul, Minn., assignor of one-half to Hugh V. Mercer, Minneapolis, Minn.

Application April 22, 1937, Serial No. 138,381

3 Claims. (Cl. 301—9)

My invention relates to an improvement in automobile hub construction, wherein the removal and replacement of a wheel is simplified, and wherein the brake mechanism may readily be centered with respect to the wheel.

It has been common practice to mount automobile wheels in place by sliding the wheel over a series of five or six studs projecting from the brake drum housing, and to tighten nuts upon the studs when the wheel is in place to hold the wheel in position. As the studs are arranged in a circle concentric with the axle or spindle upon which the wheel is mounted, and are spaced considerably apart it is rather difficult to lift the wheel and tire and properly suspend the same upon the studs. It is furthermore necessary to tighten five or six nuts on these studs, for the entire strain of the wheel is transmitted through the studs, and a plurality of the studs is necessary to securely hold the wheel.

It has also been common practice to mount the brake drum to one side of the transverse center of the wheel, so that braking pressure is applied off-center with respect to the wheel and tire. This construction creates a tendency to shear off the studs supporting the wheel upon the brake drum housing, as inertia tends to keep the wheel rotating while the brake tends to stop the brake drum. This fact likewise makes necessary a number of studs to withstand shear.

The present invention has been created as a means of overcoming these disadvantages, in an attempt to provide a wheel construction which may be more quickly and easily applied or removed, and in which the brakes are substantially centered with respect to the tread of the tire mounted upon the wheel. In attaining this result, I am also able to provide a wheel of greater strength than those in common usage without materially increasing the cost of production thereof, if at all.

It is an object of my invention to extend the brake drum housing out beyond the center of the wheel, and to provide a bearing for the wheel about the circumference of the brake drum, so that the wheel hub encircles the brake drum. In this way, the downward force of the weight of the car is transmitted through the outer extremity of the brake drum or housing therefore to a sleeve forming a part of the hub of the wheel. The spokes of the wheel may connect this sleeve with the rim of the wheel, so that the weight of the car may be centered with respect to the bearings upon which the brake drum is mounted, in the case of a front wheel.

It is a further purpose of my invention to provide a means cooperable between the brake drum and the wheel separate and distinct from the fastening means securing the wheel in position, to cause rotation of the wheel in unison with the brake drum. This separate means may be positioned at the outer periphery of the brake drum, if desired, in order to decrease the force tending to shear the locking means. It will be understood that where the wheel is secured to studs on the brake drum, the distance of these studs from the center of the hub is limited. The closer to the center these studs are positioned, the greater will be the shear force tending to shear these studs off. By positioning the locking means locking the wheel to rotate with the brake drum at a greater distance from the hub center, this shear force is decreased.

It is a further object of my invention to position at least a portion of the outer periphery of the brake drum in direct contact with a sleeve forming a part of the wheel, so that heat generated within the brake drum may be conducted to the wheel which is more readily cooled by movement of the spokes through the air. My brake drum will accordingly be more easily cooled than will be usual forms of construction.

It is a feature of my construction that most of the strain upon the wheel is transmitted directly to the periphery of the brake drum or drum housing. Accordingly, it is possible for me to secure the wheel in position by a single centrally positioned nut or other suitable locking means. This feature permits the wheel to be removed and replaced in a fraction of the time required to replace the conventional type of wheel.

These and other objects, and novel features of my invention, will be more clearly and fully set forth in the following specification and claims.

In the drawings forming a part of my specification:

Figure 1 is a cross-sectional view through a front, or steering wheel of a vehicle, showing my new construction, the position of the section being indicated by the line 1—1 of Figure 2.

Figure 2 is a lateral section centrally through the wheel, looking toward the inner side of the wheel.

Figure 3 is a perspective view of my inner brake drum inclosure upon which the brake mechanism may be mounted.

Figure 4 is a perspective view of my brake drum, illustrating a means mounted thereon cooperable with a means on the wheel to prevent relative rotation between the drum and the wheel.

Figure 5 is a perspective view of one half of the wheel used in conjunction with the brake drum of Figure 4.

Figure 6 is a cross-sectional view of a slightly different form of brake drum, with a portion of the wheel shown mounted thereupon.

Figure 7 is a vertical section through a slightly different form of construction of wheel and hub, the position of the section being indicated by the line 7—7 of Figure 8.

Figure 8 is a side elevation view, partially in central section, showing the wheel construction of Figure 7.

Figure 9 is an elevation view of the inner brake drum enclosure used in conjunction with the construction of Figures 7 and 8.

Figure 10 is an elevation view of the brake drum used in conjunction with the construction of Figures 7 and 8.

Figure 11 is an elevation view of the wheel used with the construction of Figures 7 and 8.

Figure 12 is a vertical section centrally through another modified form of construction of wheel and hub, the position of the section being indicated by the line 12—12 of Figure 13.

Figure 13 is an elevation view, partly in central section, of the wheel and hub construction shown in Figure 12.

Figure 14 is an elevation view of the inner brake drum enclosure shown in Figures 12 and 13.

Figure 15 is an elevation view of the brake drum used in conjunction with the construction of Figures 12 and 13.

Figure 16 is an elevation of the wheel used in conjunction with the construction shown in Figs. 12 and 13.

With particular reference to the construction shown in Figures 1 through 5, the spindle 10, which is similar to the usual construction, supports the wheel and hub A. The wheel and hub A comprises in general an inner brake drum enclosure 11, a brake drum portion 12, and a wheel 13. The inner brake drum enclosure 11 is shown as having a square opening 14 to fit upon a similarly shaped portion 15 of the spindle 10 in order to prevent rotation of this enclosure 11 with respect to the spindle 10. As will be understood, other fastening means can be provided if desired to accomplish the same result, it only being necessary to prevent rotation of the inner enclosure 11.

The enclosure 11 is provided with an outwardly extending circular flange 16, a second outwardly extending flange 17 of greater radius, and an inwardly and outwardly extending portion at the periphery thereof, forming a circular groove or channel 19. The brake operating mechanism extends through the enclosure 11 between the flanges 16 and 17, and is shown as comprising a tube or nipple 20 connected to a hydraulic cylinder 21, which in turn operates through arms 22 to pivot the brake shoes 23. As will be apparent, the particular style of brake used has no bearing on the present invention, only the position of the brake being of particular interest. The brake shoes 23 are shown as pivoted at 24 to the enclosure 11.

The brake drum 12 is shown as mounted on spaced bearings 25 and 26; and comprises a bearing sleeve 27, an outwardly extending disc 29, and a peripheral cylindrical drum or sleeve 30 against the surface of which the brake shoes 23 engage. The sleeve 30 extends into proximity with the outwardly extending flange 17 on the enclosure 11. The disc 29 may be flat, or may flare outwardly toward the center as shown, to change the outer appearance of the wheel.

The brake drum 12 is held in position upon the spindle 10 by means of a locking nut 31 which is threaded upon the spindle, and which holds the outer bearing 26 in position upon the spindle.

Upon the outer surface of the brake drum 12, mounted upon the disc 29, I provide a locking segment 32 which presents shoulders 33 at the ends thereof. This segment 32 is cooperable with a similar complementary segment 34 secured to the wheel 13, the shoulders 33 engaging similar end shoulders 35 on the segment 34. The relative rotation of the wheel 13 in either direction with respect to the brake drum 12 is in this way prevented when the wheel is in place.

The wheel 13 is centrally open at 36 to accommodate the end of the bearing sleeve 27 and is held in place by a cap 37 threaded into the end of the sleeve 27. The wheel 13 extends outwardly in a disc portion 39, shaped to conform with the shape of the disc portion 29 of the brake drum 12. The sleeve 40 extends to a point adjacent the flange 17, over the flange 17 covering the flange, and follows the contour of the enclosure 11, terminating in a flange 41 in the circular groove or channel 19. This provides a tight structure which is a seal against entry of dirt or moisture into the brake drum.

A tire 42 is mounted in the rim 43 which is connected to the sleeve portion 40 of the wheel by a connecting web 44 which may be pressed to form spokes 45. The web 44 may be in the form of a disc to form a disc wheel, or may be wires or rods in the formation of a so-called wire wheel.

It will be seen that the wheel 13 is secured in position by a single cap 37, and is held against rotation with relation to the brake drum 12 by the locking segments 32 and 34. The major portion of the strain on the wheel is transmitted directly to the brake drum 12 at the extremity of this drum. Any suitable means may be employed for locking the cap 37 in position.

With respect to the type of wheel B shown in Figure 6 of the drawings, it will be noted that this construction is identical with that of Figures 1 through 5 with the exception that other holding means have been substituted for the locking segments 32 and 34 of the drum 12. In Figure 6, the drum 46 comprises a bearing sleeve 47, a disc portion 49 extending outwardly from the center from one end of the sleeve 47, and a peripheral drum or sleeve portion 50. The wheel 51 is provided with a disc portion 52 cooperating with, and following the contour of, the disc portion 49. A series of lugs 53, arranged in a circle concentric with the center of the wheel, are adapted to project through apertures 54 in the disc portion 49 when the wheel is in place. The wheel 51 is held centrally by a threaded nut on the bearing sleeve 47, as in the previous modification.

The wheel C shown in Figures 7 through 11 is mounted upon a spindle 55, on bearings 56 and 57. A nut 59 holds the outer bearing 57 in position. The brake drum 60 is provided with a central bearing sleeve 61, having near its outer end in a disc portion 62. A brake drum or sleeve portion 63 is secured peripherally to the disc portion 62.

The inner enclosure 69 is provided with a central square opening 64 to fit a squared portion 65 of the spindle 55. It is in the form of a disc, and is provided with a circumferential flange 66 which overlies a portion of the sleeve portion 63 of the brake drum 60. A second flange 67 extends outwardly from the disc forming the inner enclosure 69. This second flange is circular, and is positioned just within the sleeve portion 63 of the brake drum 60. The flanges 66 and 67 form a seal to prevent dirt and moisture from entering the brake drum.

The brake operating mechanism 70 is secured to the inner enclosure 69, and operates the brake shoes 71. The brake shoes 71 are pivoted at 72 to the inner enclosure.

The wheel portion proper, indicated as 73, of the wheel C comprises a disc portion 74, and a bearing sleeve 75. A central aperture in the disc portion 74 permits the bearing sleeve 61 to extend therethrough. A nut 76 on the bearing sleeve holds the wheel portion 73 in position. The bearing sleeve 75 is formed into a spoke portion 77 or connecting web which is connected to the rim 79. A tire 80 is ordinarily supported by the rim 79 in any suitable manner. A cap 78, threaded into the sleeve 61, locks the wheel in place. The nut 76 may be omitted if desired, or the cap 78 may merely snap in position. While the double lock provided by the nut 76 and cap 78 is sometimes advantageous, either may be eliminated.

A series of axially extending ribs 81 are circumferentially spaced about the sleeve portion 63 of the brake drum 60. These ribs 81 slidably engage into troughs or recesses 82 in the bearing sleeve 75 of the wheel 73 as the wheel portion is mounted in place, preventing relative rotation between the brake drum 60 and the wheel portion 73. It may be seen that because of the distance at which the ribs 81 are located from the center, the two elements may readily be prevented from rotation.

In the construction illustrated in Figures 12 through 16 of the drawings, the necessary spindle and bearings have been omitted; it being understood that these elements may be similar to those shown in Figures 1 and 7, or may be used somewhat as shown upon a rear vehicle wheel. This type of wheel unit D comprises, as in the other forms, an inner enclosure member 83, a brake drum element 84, and a wheel portion 85. The brake drum element 84 comprises a bearing sleeve 86, terminating at one end in a disc portion 87 extending outwardly from the center thereof. A peripheral sleeve or brake drum portion 89 is provided on the disc portion 87.

Upon the disc portion 87, I provide a locking segment 90 having shoulders 91 at either end thereof. This locking segment 90 cooperates with a locking segment 92 mounted on the wheel portion 85, the shoulder ends 91 thereof engaging the shoulder ends 93 of the segment 92 to prevent relative rotation between the brake drum element 84 and the wheel portion 85, when the wheel is in position.

As an additional means of preventing relative rotation between the brake drum and the wheel, I provide a locking band 94 extending half way around the brake drum sleeve 89 on the brake drum 84. This band 94 is secured to the sleeve 89, and cooperates with a supplementary band 95 secured to the wheel portion 85 of the unit to prevent relative rotation of these parts. The ends 96 of the band 94 butt against the ends 97 of the band 95 to prevent rotation.

The wheel portion of the wheel unit D comprises a disc portion 98, to which the segment 92 is secured; a bearing sleeve portion 99 within which the band 95 is secured, a connecting web 100 or spoke portion, and a rim 101 secured to the connecting web 100 to accommodate the tire 102.

The inner enclosure 83 is secured against rotation upon the spindle, by means of the square opening 103 which fits upon a similarly shaped portion of the spindle, or by any other suitable means. This enclosure 83 is in the form of a disc, having an outwardly extending flange 104 extending circumferentially about the same. The flange 104 overlies a portion of the sleeve portion 99 of the wheel 85. A ring 105 which is channel shaped in cross-section is secured to the outer surface of the enclosure 83, presenting spaced circular flanges 106 and 107. The outermost flange 106 projects outwardly in the space between the bearing sleeve 99 of the wheel 85 and the brake drum sleeve 89. The inner flange 107 overlies the bearing sleeve 86 on the brake drum portion or element 84.

It may be seen that this type of construction presents a double lock between the brake drum and the wheel, to prevent relative rotation in either direction. The wheel is held in position by means of a single locking nut, not shown.

The operation of the wheels and hubs are believed to be obvious from the foregoing description. The manner in which the construction can be applied to a rear, or non-steering wheel, is believed clearly understandable to those skilled in the art. The more complex construction is illustrated.

In accordance with the patent statutes, I have described the principles of operation and construction of my wheel and hub, and while I have endeavored to set forth the best embodiments thereof, I desire to have it understood that this is only illustrative of a means of carrying out my invention, and that obvious changes may be made within the scope of the following claims without departing from the spirit of my invention.

I claim:

1. A wheel and hub construction comprising a hub, bearings thereupon, a sleeve supported by said bearings, a brake drum concentric with said sleeve, disc means connecting said sleeve and said drum, a second sleeve adapted to encircle said brake drum, cooperating abutting plates between said drum and said sleeve last mentioned to transmit strain from said drum to said sleeve last mentioned, said abutting plates permitting a single rotative relation between said drum and sleeve, a disc flange on said second sleeve overlying said disc connecting means, and abutting plates on said disc flange and said disc means to further lock said second sleeve from rotation.

2. A hub and wheel construction including a hub, a brake drum rotatably mounted with respect to said hub, a disc portion on said drum, a sleeve enclosing said drum, arcuated abutting plates on said drum and sleeve to prevent relative rotation therebetween, and to place the sleeve in set rotative relation with respect to said drum, a disc portion on said sleeve, abutting plates on said disc portion on said drum and said disc portion on said sleeve to further lock said drum and sleeve from relative rotation.

3. A hub and wheel construction including a hub, a brake drum mounted with respect to said hub by a disc portion, a wheel sleeve enclosing said drum, arcuate abutting plates on said drum and sleeve to prevent relative rotation therebetween and to place the sleeve in set rotative relation with respect to said drum, a disc portion on said sleeve, and cooperable means on said first disc portion and said disc portion on said sleeve to further lock said drum and sleeve from relative rotation.

ALFRED T. PETERSON.